United States Patent
Ye et al.

(10) Patent No.: US 12,101,042 B2
(45) Date of Patent: Sep. 24, 2024

(54) SYSTEM AND METHOD FOR CONTROLLING ELECTRIC MOTORS TO FUNCTION AS A VIRTUAL ELECTRONIC LOCKING DIFFERENTIAL

(71) Applicant: GM GLOBAL TECHNOLOGY OPERATIONS LLC, Detroit, MI (US)

(72) Inventors: Shaochun Ye, Northville, MI (US); Robert L. Morris, Milford, MI (US); Jordan Billet, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 372 days.

(21) Appl. No.: 17/408,573

(22) Filed: Aug. 23, 2021

(65) Prior Publication Data
US 2023/0056052 A1  Feb. 23, 2023

(51) Int. Cl.
*H02P 6/06* (2006.01)
*B60L 3/06* (2006.01)
(Continued)

(52) U.S. Cl.
CPC .............. *H02P 21/18* (2016.02); *B60L 3/06* (2013.01); *B60L 3/106* (2013.01); *B60L 15/2009* (2013.01); *B60L 15/2072* (2013.01); *B60L 15/36* (2013.01); *H02P 6/06* (2013.01); *B60L 2240/14* (2013.01); *B60L 2240/421* (2013.01); *B60L 2240/423* (2013.01)

(58) Field of Classification Search
None
See application file for complete search history.

(56) References Cited

U.S. PATENT DOCUMENTS 5,082,333 A * 1/1992 Fukushima ......... B60T 8/17636
701/80
7,451,847 B2 * 11/2008 Hommi ................. B60K 6/365
180/197
(Continued)

FOREIGN PATENT DOCUMENTS

CN     208544105 U  *  2/2019
DE      4011291 A1     10/1991
(Continued)

OTHER PUBLICATIONS

Hori, Yoichi, "Future Vehicle Driven by Electricity and Control—Research on Four-Wheel-Motored "UOT Electric March II"", Oct. 2004, IEEE Transactions on Industrial Electronics, vol. 51, Issue 5, p. 954-962 (Year: 2004).*

(Continued)

*Primary Examiner* — Todd Melton
*Assistant Examiner* — Sarah A. Mueller (57) ABSTRACT

A system includes a reference speed module and a motor control module. The reference speed module is configured to determine a reference speed range based on a speed of a left wheel of a pair of front or rear wheels of a vehicle and a speed of a right wheel of the pair of front or rear wheels. The right wheel is disconnected from the left wheel. The motor control module is configured to control at least one of a first electric motor and a second electric motor based on the reference speed range. The first electric motor is connected to the left wheel. The second electric motor is connected to the right wheel.

16 Claims, 3 Drawing Sheets

(51) Int. Cl.
*B60L 3/10* (2006.01)
*B60L 15/20* (2006.01)
*B60L 15/36* (2006.01)
*H02P 21/18* (2016.01)

(56) References Cited

U.S. PATENT DOCUMENTS

| | | | | |
|---|---|---|---|---|
| 7,906,919 | B2 * | 3/2011 | Nakamura | B60L 3/106 |
| | | | | 318/52 |
| 10,927,934 | B2 * | 2/2021 | Zheng | B60K 17/16 |
| 11,021,068 | B2 * | 6/2021 | Shindo | B60W 10/188 |
| 11,027,617 | B2 * | 6/2021 | Shindo | B60L 9/18 |
| 2015/0246612 | A1 * | 9/2015 | Velde | E02F 9/0841 |
| | | | | 180/246 |
| 2019/0276023 | A1 * | 9/2019 | Kikuchi | B60W 10/119 |
| 2022/0314788 | A1 * | 10/2022 | Dong | B60K 17/36 |
| 2022/0396312 | A1 * | 12/2022 | Flumeri | B60L 3/106 |

FOREIGN PATENT DOCUMENTS

| | | | | |
|---|---|---|---|---|
| DE | 102018214763 | A1 | 3/2020 | |
| WO | WO-2021147943 | A1 * | 7/2021 | ............. B60L 15/20 |

OTHER PUBLICATIONS

Machine translation of Liu et al. (CN-208544105-U) (Year: 2019).*
On-line article titled "The 2022 GMC Hummer EV Boasts Lockers And Up To 15.9 Inches Of Ground Clearance" URL: https://www.carscoops.com/2020/10/the-2022-gmc-hummer-ev-boasts-lockers-and-up-to-15-9-inches-of-ground-clearance/; By Gauthire, M., Oct. 21, 2020.
Machine translation of German Office Action for corresponding German Application No. 10 2022 110 685.3 dated Jun. 20, 2024.

* cited by examiner

SYSTEM AND METHOD FOR CONTROLLING ELECTRIC MOTORS TO FUNCTION AS A VIRTUAL ELECTRONIC LOCKING DIFFERENTIAL

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for controlling electric motors to function as a virtual electronic locking differential.

A differential transmits torque from a power source, such as the engine or an electric motor, to a pair of wheels on an axle. An open differential always provides the same torque to each of the wheels. Thus, the wheels have different levels of traction, the wheels rotate at different speeds. In contrast, a locking differential locks the wheels together as if the wheels are rotating on a common shaft such that the wheels rotate at the same speed regardless of the levels of traction at each wheel. An electronic locking differential includes an electronic solenoid that is operable to lock the wheels together or unlock the wheels from one another.

SUMMARY

An example of a system according to the present disclosure includes a reference speed module and a motor control module. The reference speed module is configured to determine a reference speed range based on a speed of a left wheel of a pair of front or rear wheels of a vehicle and a speed of a right wheel of the pair of front or rear wheels. The right wheel is disconnected from the left wheel. The motor control module is configured to control at least one of a first electric motor and a second electric motor based on the reference speed range. The first electric motor is connected to the left wheel. The second electric motor is connected to the right wheel.

In one aspect, the reference speed module is configured to select one of the left and right wheel speeds based on magnitudes thereof, set a midrange reference speed to the selected speed, and determine the reference speed range based on the midrange reference speed and an allowable slip.

In one aspect, the reference speed range extends from a minimum reference speed to a maximum reference speed, the reference speed module is configured to determine the minimum reference speed by subtracting the allowable slip from the midrange reference speed, and the reference speed module is configured to determine the maximum reference speed by adding the allowable slip to the midrange reference speed.

In one aspect, the reference speed module is configured to set the midrange reference speed equal to a minimum value of the left and right wheel speeds when a driver of the vehicle requests that the vehicle accelerate, and set the midrange reference speed equal to a maximum value of the left and right wheel speeds when the driver requests that the vehicle decelerate.

In one aspect, the reference speed module is configured to determine whether the driver requests that the vehicle accelerates or decelerates based on at least one of an accelerator pedal position and a brake pedal position.

In one aspect, the reference speed module is configured to determine the allowable slip based on at least one of a driver input and whether the vehicle is turning.

In one aspect, when one of the left and right wheel speeds is outside of the reference speed range, the motor control module is configured to control the one of the first and second electric motors connected to the one of the left and right wheels to adjust the speed of the one of the left and right wheels to a value within the reference speed range, and control the other one of the first and second electric motors based on an axle torque request.

In one aspect, the motor control module is configured to maintain the axle torque request at a constant value when the one of the left and right wheel speeds is outside of the reference speed range.

In one aspect, the motor control module is configured to stop maintaining the axle torque request at the constant value, adjust the axle torque request to a driver torque request, and control both of the first and second electric motors based on the axle torque request when (i) the one of the left and right wheel speeds is within the reference speed range, and (ii) the driver torque request is less than an estimated axle torque.

In one aspect, the motor control module is configured to control both of the first and second electric motors based on the reference speed range.

Another example of a system according to the present disclosure includes a reference speed module and a motor control module. The reference speed module is configured to determine a reference speed range based on at least one of a speed of a left wheel of a pair of front or rear wheels of a vehicle and a speed of a right wheel of the pair of front or rear wheels. The right wheel is disconnected from the left wheel. The motor control module is configured to control one a first electric motor and a second electric motor based on the reference speed range when one of the left and right wheel speeds is outside of the reference speed range. The one of the first and second electric motors is connected to the one of the left and right wheel speeds. The motor control module is configured to control the other one of the first and second electric motors based on an axle torque request. The other one of the first and second electric motors is connected to the other one of the left and right wheel speeds.

In one aspect, the reference speed module is configured to set a midrange reference speed to one of the left and right wheel speeds, and determine the reference speed range based on the midrange reference speed and an allowable slip.

In one aspect, the reference speed range extends from a minimum reference speed to a maximum reference speed, the reference speed module is configured to determine the minimum reference speed by subtracting the allowable slip from the midrange reference speed, and the reference speed module is configured to determine the maximum reference speed by adding the allowable slip to the midrange reference speed.

In one aspect, the reference speed module is configured to set the midrange reference speed equal to a minimum value of the left and right wheel speeds when a driver of the vehicle requests that the vehicle accelerate, and set the midrange reference speed equal to a maximum value of the left and right wheel speeds when the driver requests that the vehicle decelerate.

In one aspect, the motor control module is configured to control the one of the first and second electric motors connected to the one of the left and right wheels to adjust the speed of the one of the left and right wheels to a value within the reference speed range, and maintain the axle torque request at a constant value.

In one aspect, the motor control module is configured to stop maintaining the axle torque request at the constant value, adjust the axle torque request to a driver torque request, and control both of the first and second electric motors based on the axle torque request when (i) the one of the left and right wheel speeds is within the reference speed range, and (ii) the driver torque request is less than an estimated axle torque.

A vehicle according to the present disclosure includes a left wheel, a right wheel disconnected from the left wheel, a first electric motor connected to the left wheel, a second electric motor connected to the right wheel, a reference speed module, and a motor control module. The left and right wheels form a pair of front or rear wheels of the vehicle. The reference speed module is configured to determine a reference speed range based on at least one of a speed of the left wheel and a speed of the right wheel. The motor control module is configured to control one the first and second electric motors based on the reference speed range when one of the left and right wheel speeds is outside of the reference speed range. The one of the first and second electric motors is connected to the one of the left and right wheel speeds. The motor control module is configured to control the other one of the first and second electric motors based on an axle torque request. The other one of the first and second electric motors is connected to the other one of the left and right wheel speeds.

In one aspect, when one of the left and right wheel speeds is outside of the reference speed range, the motor control module is configured to control the one of the first and second electric motors connected to the one of the left and right wheels to adjust the speed of the one of the left and right wheels to a value within the reference speed range, and maintain the axle torque request at a constant value.

In one aspect, the motor control module is configured to stop maintaining the axle torque request at the constant value, adjust the axle torque request to a driver torque request, and control both of the first and second electric motors based on the axle torque request when (i) the one of the left and right wheel speeds is within the reference speed range, and the driver torque request is less than an estimated axle torque.

In one aspect, the first electric motor is configured to rotate the left wheel independent of the second electric motor rotating the right wheel, and the first electric motor is configured to rotate the right wheel independent of the first electric motor rotating the left wheel.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A vehicle according to the present disclosure includes a front or rear axle having a pair of electric motors that independently drive a pair of wheels on the axle. The electric motor and the wheel on one side of the axle are mechanically disconnected from the electric motor and the wheel on the other side of the axle and vice versa. Thus, the vehicle does not include a differential that transmits torque from the electric motors to the wheels. Accordingly, if the level of traction at one of the wheels is different than the level of traction at the other wheel and the electric motors provide the same amount of torque to each wheel, the wheels may rotate at different speeds. Hence, there is a potential for the speed of one of the wheels to flare.

To avoid these issues, a control system according to the present disclosure controls the electric motors to drive the wheels in a way that functions as a virtual electronic locking differential. The control system accomplishes this by determining a reference speed range based on the speeds of the wheels and controlling at least one of the electric motors based on the reference speed range. In one example, the reference speed range is small and centered about the speed of one of the wheels, and the control system controls the electric motor connected to the other wheel to maintain the speed of the other wheel within the reference speed range. In this manner, the control system controls the electric motors to function as a virtual electronic locking differential by rotating the wheels at or near the same speed.

A virtual electronic locking differential according to the present disclosure has several advantages over a physical or mechanical locking differential. For example, a mechanical locking differential allows zero slip between the speeds of wheels that are connected to the locking differential. However, a small amount of slip may be desired in certain situations, such as when the vehicle is turning. In contrast, the virtual electronic locking differential can vary the amount of allowable slip.

In addition, a mechanical locking differential can experience delays in engagement since the speeds of the wheels connected to the differential must be brought below a threshold to physically engage. Furthermore, a mechanical locking differential can experience delays in disengagement since the differential can bind depending on the level of traction at each wheel, which may lead to high axle loads and hopping on dry pavement. In contrast, the virtual electronic locking differential can lock or unlock the wheels by varying the amount of allowable slip without any delays in engagement or disengagement. Moreover, a mechanical locking differential can be noisy, while the virtual electronic locking differential makes little to no noise.

In the example below, a vehicle includes a pair of rear electric motors that independently drive a pair of rear wheels, and a control system controls the rear electric motors to function as a virtual electronic locking differential. In addition, the vehicle includes a single front electric motor that drives a pair of front wheels through a physical electronic locking differential. However, instead of having only one front electric motor, the vehicle may include a pair of front electric motors that independently drive the front wheels, and the control system may control the front electric motors to function as a virtual electronic locking differential.

In addition, the rear wheels may be driven by a single rear electric motor through a physical electronic differential, or the rear wheels may be independently driven by a pair of rear electric motors. In the latter case, the control system may control each pair of the front and rear electric motors to function as a virtual electronic locking differential.

Figure 1:
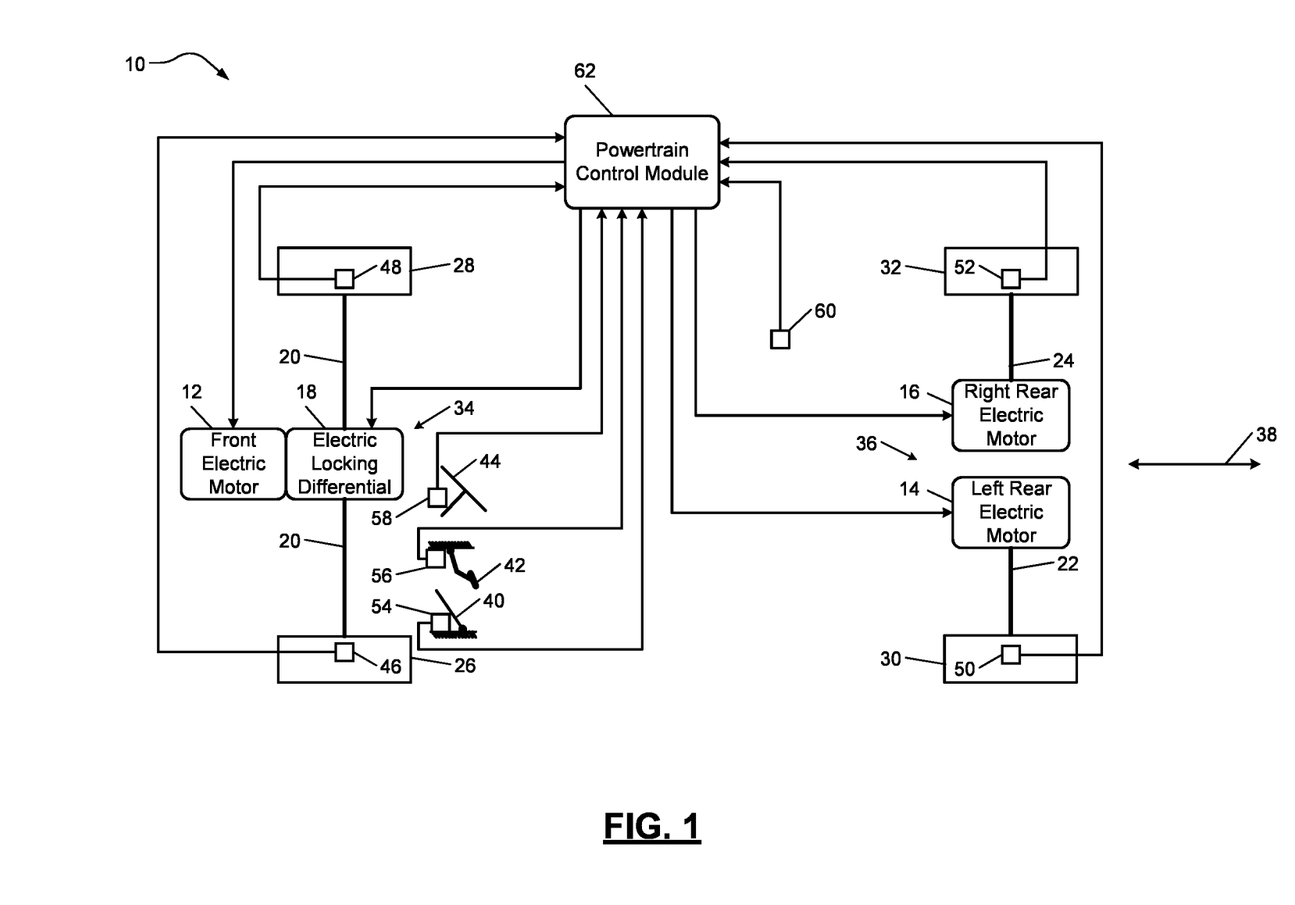
FIG. 1 is a functional block diagram of an example vehicle according to the present disclosure.

Referring now to FIG. 1, a vehicle 10 includes a front electric motor 12, a left rear electric motor 14, a right rear electric motor 16, an electronic locking differential 18, front half shafts 20, a left rear half shaft 22, a right rear half shaft 24, a left front wheel 26, a right front wheel 28, a left rear wheel 30, and a right rear wheel 32. The front electric motor 12 outputs drive torque to rotate the left and right front wheels 26 and 28. The electronic locking differential 18 transfers drive torque from the front electric motor 12 to the left and right front wheels 26 and 28. In addition, the electronic locking differential 18 is operable to lock the left and right front wheels 26 and 28 together such that the left and right front wheels 26 and 28 rotate at or near the same speed. The electronic locking differential 18 includes a solenoid that is electronically controlled to lock or unlock the left and right front wheels 26 and 28.

The front half shafts 20 connect the electronic locking differential 18 to the left and right front wheels 26 and 28. In various implementations, the vehicle 10 includes front reduction gears (not shown) that transfer torque from the front electric motor 12 to the electronic locking differential 18 at one or one gear ratios. The electronic locking differential 18 and the front half shafts 20 collectively form a front axle 34 of the vehicle 10. The front electric motor 12, the reduction gears, and/or the left and right front wheels 26 and 28 may also be considered part of the front axle 34.

The left rear electric motor 14 outputs drive torque to rotate the left rear wheel 30. The right rear electric motor 16 outputs drive torque to rotate the right rear wheel 32. The left rear half shaft 22 connects the left rear electric motor 14 to the left rear wheel 30. The right rear half shaft 24 connects the right rear electric motor 16 to the right rear wheel 32. In various implementations, the vehicle 10 includes rear reduction gears (not shown) that transfer torque from the left and right rear electric motors 14 and 16 to the left and right rear half shafts 22 and 24, respectively, at one or more gear ratios. The left and right rear half shafts 22 and 24 collectively form a rear axle 36 of the vehicle 10. The left and right rear electric motors 14 and 16 and/or the rear reduction gears may also be considered part of the rear axle 36.

The left rear electric motor 14 rotates the left rear wheel 30 independent of the right rear electric motor 16 rotating the right rear wheel 32. The right rear electric motor 16 rotates the right rear wheel 32 independent of the left rear electric motor 14 rotating the left rear wheel 30. The left and right rear wheels 30 and 32 are on the rear axle 36 and are aligned with one another in a longitudinal (fore-aft) direction 38 of the vehicle 10. However, the left and right rear wheels 30 and 32 are disconnected from one another since the rear axle 36 does not connect the left and right rear wheels 30 and 32 to one another.

The vehicle 10 further includes an accelerator pedal 40, a brake pedal 42, a steering wheel 44, a left front wheel speed sensor 46, a right front wheel speed sensor 48, a left rear wheel speed sensor 50, a right rear wheel speed sensor 52, an accelerator pedal position sensor 54, a brake pedal position sensor 56, a steering wheel position sensor 58, a vehicle motion sensor 60, and a powertrain control module 62. A driver of the vehicle 10 depresses the accelerator pedal 40 to accelerate the vehicle 10. The driver depresses the brake pedal 42 to decelerate or stop the vehicle 10. The driver rotates the steering wheel 44 to turn the vehicle 10. In various implementations, the vehicle 10 may be an autonomous vehicle, in which case the accelerator pedal 40, the steering wheel 44, and the brake pedal may be omitted and/or an autonomous driver module (not shown) may control the acceleration, steering, and braking of the vehicle 10.

The left front wheel speed sensor 46 measures the speed of the left front wheel 26 and generates a signal indicating the left front wheel speed. The right front wheel speed sensor 48 measures the speed of the right front wheel 28 and generates a signal indicating the right front wheel speed. The left rear wheel speed sensor 50 measures the speed of the left rear wheel 30 and generates a signal indicating the left rear wheel speed. The right rear wheel speed sensor 52 measures the speed of the right rear wheel 32 and generates a signal indicating the right rear wheel speed.

The accelerator pedal position sensor 54 measures the position of the accelerator pedal 40 and generates a signal indicating the accelerator pedal position. The brake pedal position sensor 56 measures the position of the brake pedal 42 and generates a signal indicating the brake pedal position. The steering wheel position sensor 58 measures the position of the steering wheel 44 and generates a signal indicating the steering wheel position.

The vehicle motion sensor 60 measures the longitudinal (fore-aft) acceleration of the vehicle 10, the lateral (side-to-side) acceleration of the vehicle 10, and the yaw rate of the vehicle 10. The vehicle motion sensor 60 may be an inertial measurement unit, which may include accelerometers that measure the longitudinal and lateral vehicle acceleration and a gyroscope the measures the vehicle yaw rate. The vehicle motion sensor 60 generates a signal indicating the longitudinal vehicle acceleration, the lateral vehicle acceleration, and the vehicle yaw rate.

The powertrain control module 62 controls the front electric motor 12, the left rear electric motor 14, the right rear electric motor 16, and the electronic locking differential 18 based on inputs from the sensors of the vehicle 10. In one example, the powertrain control module 62 controls the left and right rear electric motors 14 and 16 based on the sensor inputs to independently drive the left and right rear wheels 30 and 32 in a way that functions as a virtual electronic locking differential. The powertrain control module 62 may accomplish this by determining a reference speed range based on the rear wheel speeds and controlling the left rear electric motor 14 and/or the right rear electric motor 16 based on the reference speed range. In one example, the reference speed range is relatively small and is centered about the speed of one of the rear wheels, and the powertrain control module 62 controls the rear electric motor 14 or 16 connected to the other rear wheel to maintain the speed of the other rear wheel within the reference speed range. In this manner, the powertrain control module 62 controls the left and right rear electric motors 14 and 16 to function as a virtual electronic locking differential by rotating the left and right rear wheels 30 and 32 at or near the same speed.

Figure 2:
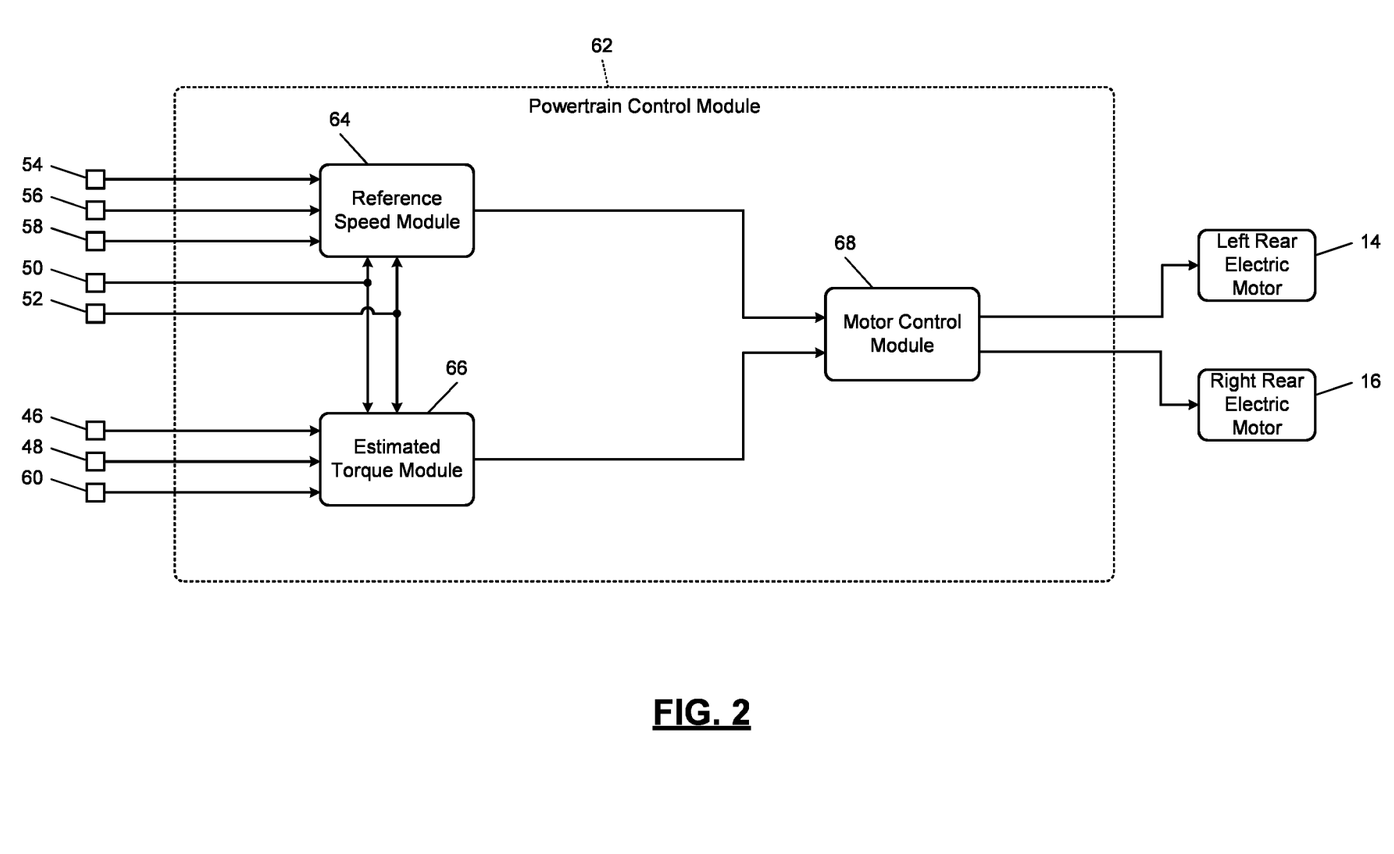
FIG. 2 is a functional block diagram of an example powertrain control module according to the present disclosure.

Referring now to FIG. 2, an example implementation of the powertrain control module 62 includes a reference speed module 64, an estimated torque module 66, and a motor control module 68. The reference speed module 64 determines the reference speed range based on the left and right rear wheel speeds from the left and right rear wheel speed sensors 50 and 52. The reference speed range extends from a minimum reference speed to a maximum reference speed. The reference speed module 64 outputs the reference speed range.

In one example, the reference speed module 64 selects one of the rear wheel speeds, sets a midrange reference speed equal to the selected speed, and determines the minimum and maximum reference speeds based on the midrange reference speed and an allowable slip. The allowable slip is an allowable difference between the rear wheel speeds. The reference speed module 64 may determine the allowable slip based on a driver input and/or whether the vehicle 10 is turning.

In one example, the driver may touch a button or touchscreen (not shown) of the vehicle 10 to activate or deactivate a virtual electronic differential (eLocker) function. The reference speed module 64 may set the allowable slip to a small value, such as 1 revolutions per minute (RPM), when the virtual eLocker function is activated. The reference speed module 64 may set the allowable slip to a large value when the virtual eLocker function is deactivated.

In one example, the reference speed module 64 sets the allowable slip to a small value when the vehicle 10 is moving in a straight line, and the reference speed module 64 increases the allowable slip when the vehicle 10 is turning to prevent binding. The amount by which the allowable slip is increased may be based on the magnitude of the turn and/or the speed of the vehicle 10. The reference speed module 64 may determine whether the vehicle 10 is turning and the magnitude of the turn based on the steering wheel position from the steering wheel position sensor 58.

The reference speed module 64 selects one of the rear wheel speeds based on the magnitudes of the rear wheel speeds before setting the midrange reference speed equal to the selected speed. In one example, the reference speed module 64 sets the midrange reference speed equal to a minimum value of the left and right rear wheel speeds when the driver requests that the vehicle 10 accelerates. Conversely, the reference speed module 64 sets the midrange reference speed equal to a maximum value of the left and right rear wheel speed when the driver requests that the vehicle 10 decelerates. The reference speed module 64 may determine whether the driver requests vehicle acceleration or deceleration based on the accelerator pedal position and the brake pedal position from the accelerator pedal position sensor 54 and the brake pedal position sensor 56, respectively.

The estimated torque module 66 estimates a drive torque of the rear axle 36. The rear axle torque may be equal to the sum of the torques output by the left and right rear electric motors 14 and 16. The estimated torque module 66 may estimate the rear axle torque based on the speeds of the left and right rear electric motors 14 and 16 and the amount of power supplied thereto using, for example, a function or mapping. Additionally or alternatively, the estimated torque module 66 may estimate the rear axle torque based on one or more of the speed of the vehicle 10, the longitudinal acceleration of the vehicle 10, the lateral acceleration of the vehicle 10, and the yaw rate of the vehicle 10. The estimated torque module 66 may determine the vehicle speed based on one or more of the wheel speeds from the left front wheel speed sensor 46, the right front wheel speed sensor 48, the left rear wheel speed sensor 50, and the right rear wheel speed sensor 52. The estimated torque module 66 outputs the estimated axle torque (estimated torque of the rear axle 36).

The motor control module 68 controls the left and right rear electric motors 14 and 16. In one example, the motor control module 68 controls the amount of torque output by the left and right rear electric motors 14 and 16 to minimize a difference between the axle torque request and the estimated axle torque. The motor control module 68 may set the axle torque request equal to a driver torque request. The motor control module 68 may determine driver torque request based on the accelerator pedal position from the accelerator pedal position sensor 54.

In one example, the motor control module 68 controls the left and right rear electric motors 14 and 16 based on the axle torque request as long as the rear wheel speeds are within the reference speed range. If the speed of one of the rear wheels 30 or 32 is outside of the reference speed range, the motor control module 68 controls the rear electric motor 14 or 16 connected thereto to adjust the speed of the one rear wheel 30 or 32 to a value within the reference speed range. In addition, the motor control module 68 maintains the axle torque request at a constant value, and controls the other rear wheel 30 or 32 based on the axle torque request. The constant value may be the value of the rear axle torque request at the time when the speed of the one rear wheel 30 or 32 is first outside of the reference speed range.

The motor control module 68 continues to maintain the axle torque request at the constant value until the speed of the one rear wheel 30 or 32 is within the reference speed range and the driver torque request is less than the estimated axle torque. At that time, the motor control module 68 may stop maintaining the axle torque request at the constant value, adjust the axle torque request to a driver torque request, and control both of the left and right rear electric motors 14 and 16 based on the axle torque request. The motor control module 68 may adjust the axle torque request to the driver torque request at a predetermined rate.

Figure 3:
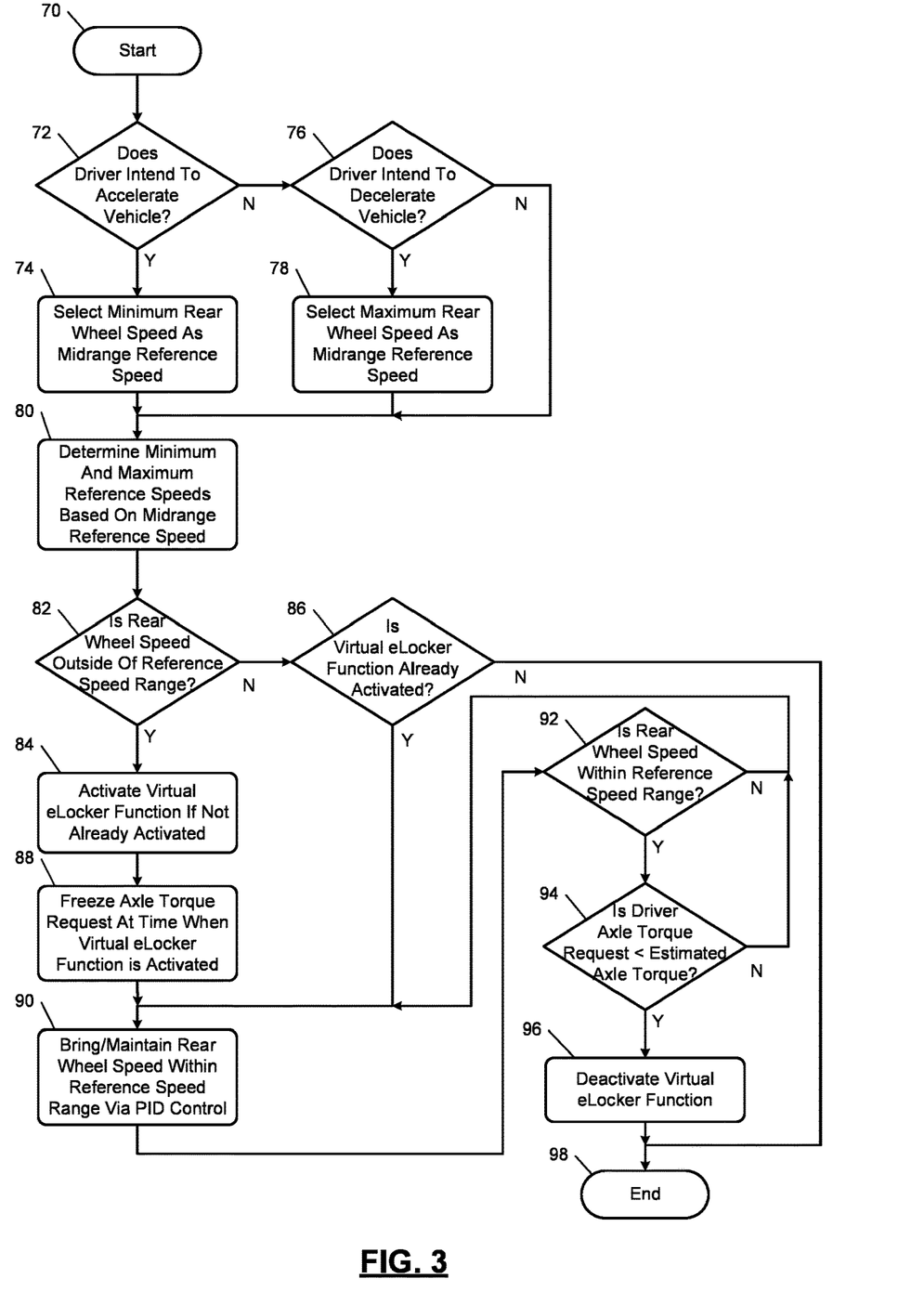
FIG. 3 is a flowchart illustrating an example powertrain control method according to the present disclosure.

Referring now to FIG. 3, a method for controlling the left and right rear electric motors 14 and 16 to independently drive the left and right rear wheels 30 and 32 to perform the virtual eLocker function begins at 70. At 72, the reference speed module 64 determines whether the driver of the vehicle 10 intends to accelerate the vehicle 10. The reference speed module 64 may make this determination based on the accelerator pedal position from the accelerator pedal position sensor 54. If the driver intends to accelerate the vehicle 10, the method continues at 74. Otherwise, the method continues at 76. At 74, the reference speed module 64 selects the minimum value of the rear wheel speeds as the midrange reference speed.

At 76, the reference speed module 64 determines whether the driver intends to decelerate the vehicle 10. The reference speed module 64 may make this determination based on the brake pedal position from the brake pedal position sensor 56. If the driver intends to decelerate the vehicle 10, the method continues at 78. Otherwise, the method continues at 80. At 78, the reference speed module 64 selects the maximum value of the rear wheel speeds as the midrange reference speed.

At 80, the reference speed module 64 determines the minimum and maximum reference speeds based on the midrange reference speed and the allowable slip. The reference speed module 64 determines the minimum reference speed by subtracting the allowable slip from the midrange reference speed. The reference speed module 64 determines the maximum reference speed by adding the allowable slip to the midrange reference speed.

At 82, the motor control module 68 determines whether one of the rear wheel speeds is outside of the reference speed range. If one of the rear wheel speed is outside of the reference speed range, the method continues at 84. Otherwise, the method continues at 86.

At 84, the motor control module 68 activates the virtual eLocker function if the virtual eLocker function is not already activated. At 88, the motor control module 68 freezes the axle torque request at its value corresponding to the point in time when the virtual eLocker function is activated and/or the point in time when the one rear wheel speed is initially outside of the reference speed range. At 90, the motor control module 68 brings or maintains the one rear wheel speed within the reference speed range using proportional integral derivative (PID) control. The reference speed module 64 adjusts the reference speed range based on the speed of the other rear wheel while the virtual eLocker function is activated. The reference speed module 64 accomplishes this by setting the midrange reference speed equal to the speed of the other rear wheel, and determining the minimum and maximum reference speeds based on the midrange reference speed and the allowable slip.

At 92, the motor control module 68 determines whether the one rear wheel speed is within the reference speed range. If the one rear wheel speed is within the reference speed range, the method continues at 94. Otherwise, the method returns to 90.

At 94, the motor control module 68 determines whether the driver torque request is less than the estimated axle torque. If the driver torque request is less than the estimated axle torque, the method continues at 96. Otherwise, the method returns to 90. At 96, the motor control module 68 deactivates the virtual eLocker function. In turn, the motor control module 68 stops freezing the axle torque request, adjusts the axle torque request to the driver torque request, and controls both of the left and right electric motors 14 and 16 based on the axle torque request.

At 86, the motor control module 68 determines whether the virtual eLocker function is already activated. If the virtual eLocker function is already activated, the method continues at 90. Otherwise, the method continues at 98. The method ends at 98.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
    a reference speed module configured to determine a reference speed range based on a speed of a left wheel of a pair of front or rear wheels of a vehicle and a speed of a right wheel of the pair of front or rear wheels, wherein the right wheel is disconnected from the left wheel,
    wherein the reference speed module is configured to:
        select one of the left and right wheel speeds based on magnitudes thereof;
        set a midrange reference speed to the selected speed; and
        determine the reference speed range based on the midrange reference speed and a maximum slip based on adding and subtracting the maximum slip to and from the midrange reference speed; and
    a motor control module configured to control at least one of a first electric motor and a second electric motor based on the reference speed range, wherein:
        the first electric motor is connected to the left wheel; and
        the second electric motor is connected to the right wheel,
    wherein the reference speed module is configured to:
        set the midrange reference speed equal to a minimum value of the left and right wheel speeds when a driver of the vehicle requests that the vehicle accelerate; and
        set the midrange reference speed equal to a maximum value of the left and right wheel speeds when the driver requests that the vehicle decelerate.

2. The system of claim 1 wherein:
    the reference speed range extends from a minimum reference speed to a maximum reference speed;
    the reference speed module is configured to determine the minimum reference speed by subtracting the maximum slip from the midrange reference speed; and
    the reference speed module is configured to determine the maximum reference speed by adding the maximum slip to the midrange reference speed.

3. The system of claim 1 wherein the reference speed module is configured to determine whether the driver requests that the vehicle accelerates or decelerates based on at least one of an accelerator pedal position and a brake pedal position.

4. The system of claim 1 wherein the reference speed module is configured to determine the maximum slip based on at least one of a driver input and whether the vehicle is turning.

5. The system of claim 1 wherein when one of the left and right wheel speeds is outside of the reference speed range, the motor control module is configured to:
    control the one of the first and second electric motors connected to the one of the left and right wheels to adjust the one of the left and right wheel speeds to a value within the reference speed range; and
    control the other one of the first and second electric motors based on an axle torque request.

6. The system of claim 5 wherein the motor control module is configured to maintain the axle torque request at a constant value when the one of the left and right wheel speeds is outside of the reference speed range.

7. The system of claim 6 wherein the motor control module is configured to stop maintaining the axle torque request at the constant value, adjust the axle torque request to a driver torque request, and control both of the first and second electric motors based on the axle torque request when:
    the one of the left and right wheel speeds is within the reference speed range; and
    the driver torque request is less than an estimated axle torque.

8. The system of claim 1 wherein the motor control module is configured to control both of the first and second electric motors based on the reference speed range.

9. A system comprising:
    a reference speed module configured to determine a reference speed range based on at least one of a speed of a left wheel of a pair of front or rear wheels of a vehicle and a speed of a right wheel of the pair of front or rear wheels, wherein the right wheel is disconnected from the left wheel,
    wherein the reference speed module is configured to:
        select one of the left and right wheel speeds based on magnitudes thereof;
        set a midrange reference speed to the selected speed; and
        determine the reference speed range based on the midrange reference speed and a maximum slip based on adding and subtracting the maximum slip to and from the midrange reference speed; and a motor control module configured to:
control one of a first electric motor and a second electric motor based on the reference speed range when one of the left and right wheel speeds is outside of the reference speed range, wherein the one of the first and second electric motors is connected to the one of the left and right wheel speeds; and
control the other one of the first and second electric motors based on an axle torque request, wherein the other one of the first and second electric motors is connected to the other one of the left and right wheel speeds, wherein the reference speed module is configured to:
set the midrange reference speed equal to a minimum value of the left and right wheel speeds when a driver of the vehicle requests that the vehicle accelerate; and
set the midrange reference speed equal to a maximum value of the left and right wheel speeds when the driver requests that the vehicle decelerate.

10. The system of claim 9 wherein:
the reference speed range extends from a minimum reference speed to a maximum reference speed;
the reference speed module is configured to determine the minimum reference speed by subtracting the maximum slip from the midrange reference speed; and
the reference speed module is configured to determine the maximum reference speed by adding the maximum slip to the midrange reference speed.

11. The vehicle of claim 9 wherein the motor control module is configured to:
control the one of the first and second electric motors connected to the one of the left and right wheels to adjust the speed of the one of the left and right wheels to a value within the reference speed range; and
maintain the axle torque request at a constant value.

12. The system of claim 11 wherein the motor control module is configured to stop maintaining the axle torque request at the constant value, adjust the axle torque request to a driver torque request, and control both of the first and second electric motors based on the axle torque request when:
the one of the left and right wheel speeds is within the reference speed range; and
the driver torque request is less than an estimated axle torque.

13. A vehicle comprising:
a left wheel;
a right wheel disconnected from the left wheel, the left and right wheels forming a pair of front or rear wheels of the vehicle;
a first electric motor connected to the left wheel;
a second electric motor connected to the right wheel;
a reference speed module configured to determine a reference speed range based on at least one of a speed of the left wheel and a speed of the right wheel, wherein the reference speed module is configured to:
select one of the left and right wheel speeds based on magnitudes thereof;
set a midrange reference speed to the selected speed; and
determine the reference speed range based on the midrange reference speed and a maximum slip based on adding and subtracting the maximum slip to and from the midrange reference speed; and a motor control module configured to:
control one of the first and second electric motors based on the reference speed range when one of the left and right wheel speeds is outside of the reference speed range, wherein the one of the first and second electric motors is connected to the one of the left and right wheel speeds; and
control the other one of the first and second electric motors based on an axle torque request, wherein the other one of the first and second electric motors is connected to the other one of the left and right wheel speeds, wherein the reference speed module is configured to:
set the midrange reference speed equal to a minimum value of the left and right wheel speeds when a driver of the vehicle requests that the vehicle accelerate; and
set the midrange reference speed equal to a maximum value of the left and right wheel speeds when the driver requests that the vehicle decelerate.

14. The vehicle of claim 13 wherein when one of the left and right wheel speeds is outside of the reference speed range, the motor control module is configured to:
control the one of the first and second electric motors connected to the one of the left and right wheels to adjust the speed of the one of the left and right wheels to a value within the reference speed range; and
maintain the axle torque request at a constant value.

15. The vehicle of claim 14 wherein the motor control module is configured to stop maintaining the axle torque request at the constant value, adjust the axle torque request to a driver torque request, and control both of the first and second electric motors based on the axle torque request when:
the one of the left and right wheel speeds is within the reference speed range; and
the driver torque request is less than an estimated axle torque.

16. The vehicle of claim 13 wherein:
the first electric motor is configured to rotate the left wheel independent of the second electric motor rotating the right wheel; and
the first electric motor is configured to rotate the right wheel independent of the first electric motor rotating the left wheel.

\* \* \* \* \*